(12) United States Patent
Kim et al.

(10) Patent No.: US 12,531,187 B2
(45) Date of Patent: Jan. 20, 2026

(54) MULTILAYERED CAPACITOR

(71) Applicant: SAMSUNG ELECTRO-MECHANICS CO., LTD., Suwon-si (KR)

(72) Inventors: Seung Ah Kim, Suwon-si (KR); Gyuho Yeon, Suwon-si (KR); Chaedong Lee, Suwon-si (KR); Hyunhee Gu, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 242 days.

(21) Appl. No.: 18/538,661

(22) Filed: Dec. 13, 2023

(65) Prior Publication Data

US 2024/0282531 A1 Aug. 22, 2024

(30) Foreign Application Priority Data

Feb. 20, 2023 (KR) ........................ 10-2023-0022144

(51) Int. Cl.
*H01G 4/232* (2006.01)
*H01G 4/008* (2006.01)
(Continued)

(52) U.S. Cl.
CPC ............. *H01G 4/2325* (2013.01); *H01G 4/30* (2013.01); *H01G 4/0085* (2013.01); *H01G 4/1227* (2013.01)

(58) Field of Classification Search
CPC ...... H01G 4/2325; H01G 4/30; H01G 4/0085; H01G 4/1227
See application file for complete search history.

(56) References Cited

U.S. PATENT DOCUMENTS 10,354,802 B1 7/2019 Bae et al.
10,453,612 B2 10/2019 Terashita et al.
(Continued)

FOREIGN PATENT DOCUMENTS

JP 2019-083291 A 5/2019
JP 6915324 B2 8/2021
(Continued)

OTHER PUBLICATIONS

The Extended European Search Report dated Mar. 24, 2025 issued in European Patent Application No. 23217103.3.
(Continued)

*Primary Examiner* — Michael P McFadden
(74) *Attorney, Agent, or Firm* — Morgan, Lewis & Bockius LLP

(57) ABSTRACT

A multilayered capacitor includes a capacitor body including a dielectric layer and an internal electrode, and an external electrode disposed on the capacitor body. The external electrode includes a first region including a portion of a sintered metal layer and a portion of a plating layer and a second region including another portion of the sintered metal layer, a conductive resin layer, and another portion of the plating layer. An average thickness $T_{e1}$ of the plating layer in the first region and an average thickness $T_{e2}$ of the plating layer in the second region satisfy $0.2 \times T_{e1} < T_{e2} \leq 0.8 \times T_{e1}$.

19 Claims, 9 Drawing Sheets

(51) Int. Cl.
  *H01G 4/12* (2006.01)
  *H01G 4/30* (2006.01)

(56) References Cited

U.S. PATENT DOCUMENTS

| | | | |
|---|---|---|---|
| 10,600,570 B2 | 3/2020 | Onodera et al. | |
| 10,886,069 B2 | 1/2021 | Maekawa et al. | |
| 10,903,009 B2 | 1/2021 | Seo | |
| 2015/0083475 A1* | 3/2015 | Kim | H01G 2/06 29/25.42 |
| 2017/0098505 A1* | 4/2017 | Ando | H01G 4/232 |
| 2018/0151296 A1* | 5/2018 | Yamada | H01G 2/065 |
| 2018/0174753 A1* | 6/2018 | Terashita | H01G 4/008 |
| 2019/0066923 A1* | 2/2019 | Jung | H01G 4/008 |
| 2019/0080845 A1* | 3/2019 | Onodera | H05K 1/0271 |
| 2019/0131076 A1* | 5/2019 | Fukumura | H01G 4/232 |
| 2020/0251283 A1 | 8/2020 | Onodera et al. | |
| 2021/0057162 A1 | 2/2021 | Yamamoto | |
| 2021/0065980 A1* | 3/2021 | Jung | H01G 4/005 |
| 2021/0125783 A1 | 4/2021 | Onodera et al. | |
| 2022/0139626 A1 | 5/2022 | Cho | |
| 2022/0208474 A1 | 6/2022 | Onodera et al. | |

FOREIGN PATENT DOCUMENTS

| | | |
|---|---|---|
| JP | 6932906 B2 | 9/2021 |
| JP | 6933061 B2 | 9/2021 |
| JP | 6933062 B2 | 9/2021 |
| JP | 6942989 B2 | 9/2021 |
| KR | 10-2019-0055187 A | 5/2019 |
| KR | 10-2022-0060321 A | 5/2022 |

OTHER PUBLICATIONS

European Communication dated Oct. 14, 2025 issued in European Patent Application No. 23217103.3.

* cited by examiner

MULTILAYERED CAPACITOR

CROSS-REFERENCE TO RELATED APPLICATION

This application claims priority to and the benefit of Korean Patent Application No. 10-2023-0022144 filed in the Korean Intellectual Property Office on Feb. 20, 2023, the entire contents of which are incorporated herein by reference.

TECHNICAL FIELD

This disclosure relates to a multilayered capacitor.

BACKGROUND

A multilayered capacitor (MLCC) for automotive electrical devices and industry are exposed to environments where stress is concentrated around a mounting region and a solder fillet. When this stress is not relieved, the multilayered capacitor may be internally cracked, and these cracks may directly deteriorate characteristics and reliability of the multilayered capacitor.

In order to relieve the stress of the multilayered capacitor, a conductive resin layer is introduced into an external electrode. The conductive resin layer is composed of a metal and an epoxy resin, which may serve to absorb the stress applied to the mounted multilayered capacitor.

However, when the conductive resin layer is introduced into the external electrode, lifting or bursting defects may occur due to moisture absorption and metal oxidation during the long-term storage. In addition, since the conductive resin layer has much higher resistance than a sintered metal layer, as the conductive resin layer is introduced in a higher ratio, electric characteristics such as equivalent series resistance (ESR), equivalent series Inductance (ESL), and the like are more deteriorated.

Accordingly, there is a need to develop a multilayered capacitor that relieves the stress, while minimizing a volume of a resin electrode.

SUMMARY OF THE INVENTION

One aspect of the present disclosure provides a multilayered capacitor capable of relieving stress from an external force while minimizing a volume of the conductive resin layer to suppress crack generation, increase equivalent series resistance (ESR), and suppress burst defects.

A multilayered capacitor according to one aspect includes a capacitor body including a dielectric layer and an internal electrode, and an external electrode disposed on the capacitor body. The external electrode includes a sintered metal layer connected to the internal electrode, a conductive resin layer including a resin and configured to cover a portion of the sintered metal layer and to expose another portion of the sintered metal layer, and a plating layer configured to cover the sintered metal layer and the conductive resin layer. The external electrode includes a first region including the another portion of the sintered metal layer and a portion of the plating layer, and a second region including the portion of the sintered metal layer, the conductive resin layer, and another portion of the plating layer.

An average thickness $T_{e1}$ of the plating layer in the first region and an average thickness $T_{e2}$ of the plating layer in the second region satisfy $0.2 \times T_{e1} < T_{e2} \leq 0.8 \times T_{e1}$.

$T_{e1}$ may be about 6 μm to about 12 μm.

$T_{e2}$ may be about 2 μm to about 8 μm.

The capacitor body may have first and second surfaces opposing each other in a stacking direction of the dielectric layer and internal electrode, third and fourth surfaces opposing each other in a longitudinal direction, and fifth and sixth surfaces opposing each other in a width direction.

The external electrode may include a first electrode portion on the first surface, a second electrode portion on the second surface, a third electrode portion on the fifth and sixth surfaces, and a fourth electrode portion on one of the third and fourth surfaces.

The first electrode portion may include the sintered metal layer, the conductive resin layer, and the plating layer.

The second electrode portion may include the sintered metal layer and the plating layer, and may not include a conductive resin layer.

The third electrode portion may have the first region and the second region.

In the third electrode portion, an average length of the second region in the stacking direction may be less than or equal to about 95% of the total third electrode portion.

The fourth electrode portion may have a first region and a second region.

In the fourth electrode portion, an average length of the second region in the stacking direction may be less than or equal to about 95% of the total fourth electrode portion.

The second region may be closer to the first surface than the first region.

The first region may be closer to the second surface than the second region.

The sintered metal layer may be disposed in the first electrode portion, the second electrode portion, the first and second regions of the third electrode portion, and the first and second regions of the fourth electrode portion.

The conductive resin layer may be disposed in the first electrode portion, the second region of the third electrode portion, and the second region of the fourth electrode portion.

The plating layer may be disposed in the first electrode portion, the second electrode portion, the first region and the second region of the third electrode portion, and the first region and the second region of the fourth electrode portion.

The sintered metal layer may include a conductive metal and glass.

In the conductive resin layer, the resin may include an epoxy resin.

The conductive metal may include copper (Cu), silver (Ag), nickel (Ni), or a mixture thereof.

The plating layer may include nickel (Ni), copper (Cu), tin (Sn), palladium (Pd), platinum (Pt), gold (Au), silver (Ag), tungsten (W), titanium (Ti), lead (Pb), an alloy thereof, or a mixture thereof.

An average thickness of the sintered metal layer in the first region may be greater than an average thickness of the sintered metal layer in the second region.

The multilayered capacitor according to one aspect may suppress crack generation, increase equivalent series resistance (ESR), and suppress burst defects by relieving stress from an external force while minimizing a volume of the conductive resin layer.

DETAILED DESCRIPTION OF THE EMBODIMENTS

Figure 1:
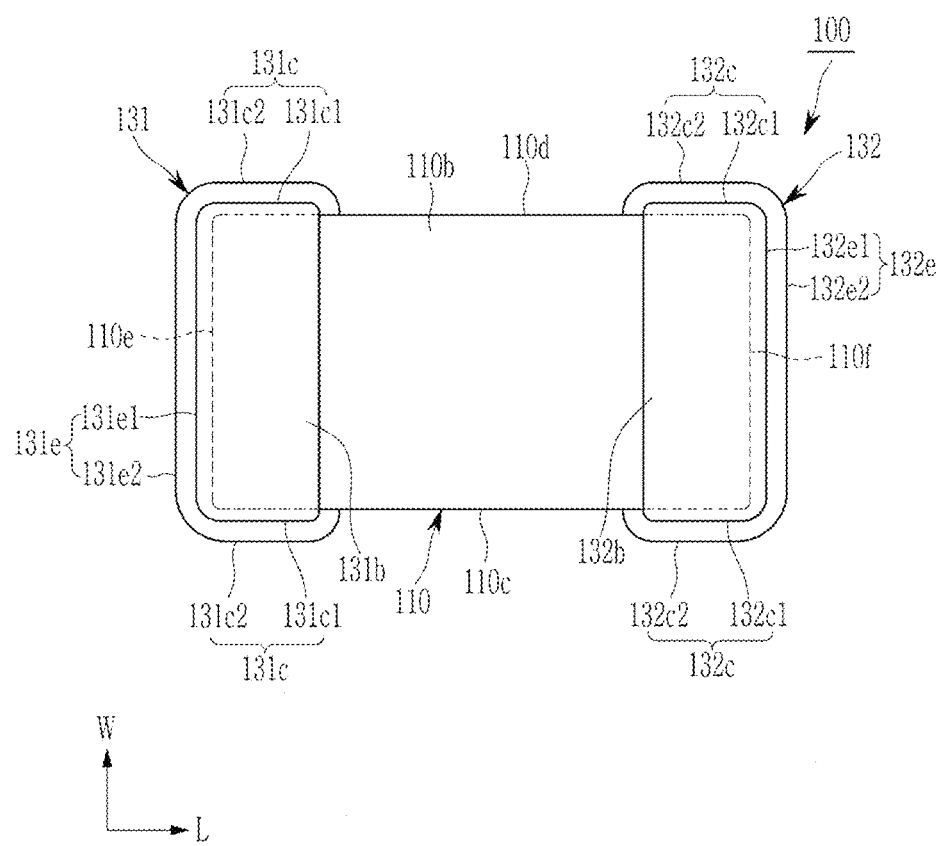
FIG. 1 is a plan view of a multilayered capacitor according to one aspect.

The present disclosure will be described more fully hereinafter with reference to the accompanying drawings, in which embodiments of the disclosure are shown. The drawings and description are to be regarded as illustrative in nature and not restrictive. Like reference numerals designate like elements throughout the specification. Further, the accompanying drawings are provided only in order to allow embodiments disclosed in the present specification to be easily understood, and are not to be interpreted as limiting the spirit disclosed in the present specification, and it is to be understood that the present disclosure includes all modifications, equivalents, and substitutions without departing from the scope and spirit of the present disclosure.

Terms including ordinal numbers such as first, second, and the like will be used only to describe various constituent elements, and are not to be interpreted as limiting these constituent elements. The terms are only used to differentiate one constituent element from other constituent elements.

It is to be understood that when one constituent element is referred to as being "connected" or "coupled" to another constituent element, it may be connected or coupled directly to the other constituent element or may be connected or coupled to the other constituent element with a further constituent element intervening therebetween. In contrast, it should be understood that, when it is described that an element is "directly coupled" or "directly connected" to another element, no element is present between the element and the other element.

Throughout the specification, it should be understood that the term "include," "comprise," "have," or "configure" indicates that a feature, a number, a step, an operation, a constituent element, a part, or a combination thereof described in the specification is present, but does not exclude a possibility of presence or addition of one or more other features, numbers, steps, operations, constituent elements, parts, or combinations, in advance. Unless explicitly described to the contrary, the word "comprise" and variations such as "comprises" or "comprising" will be understood to imply the inclusion of stated elements but not the exclusion of any other elements.

Figure 2:
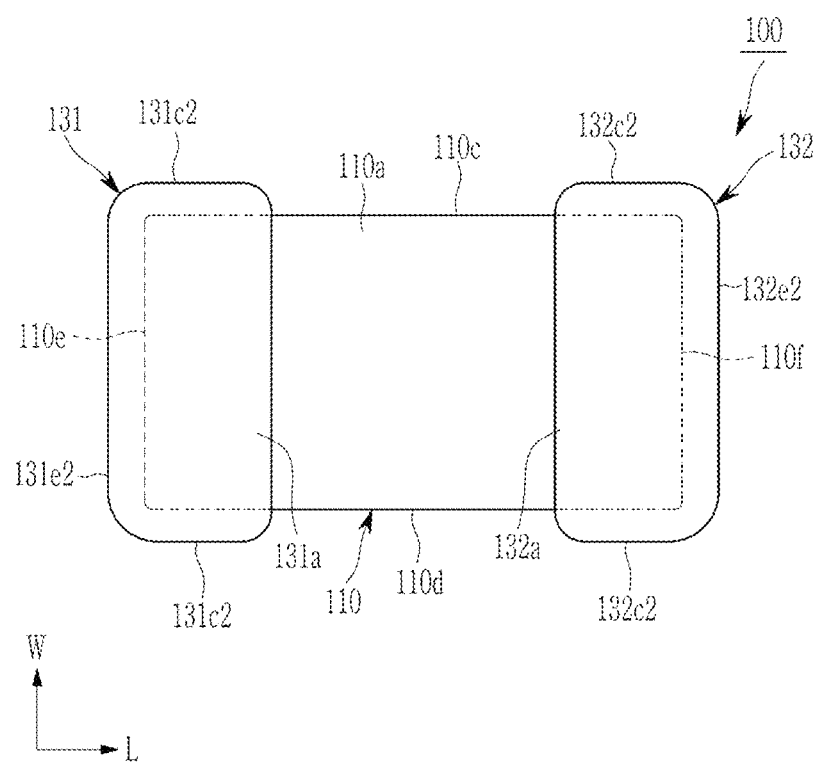
FIG. 2 is another plan view of a multilayered capacitor according to one aspect.
Figure 3:
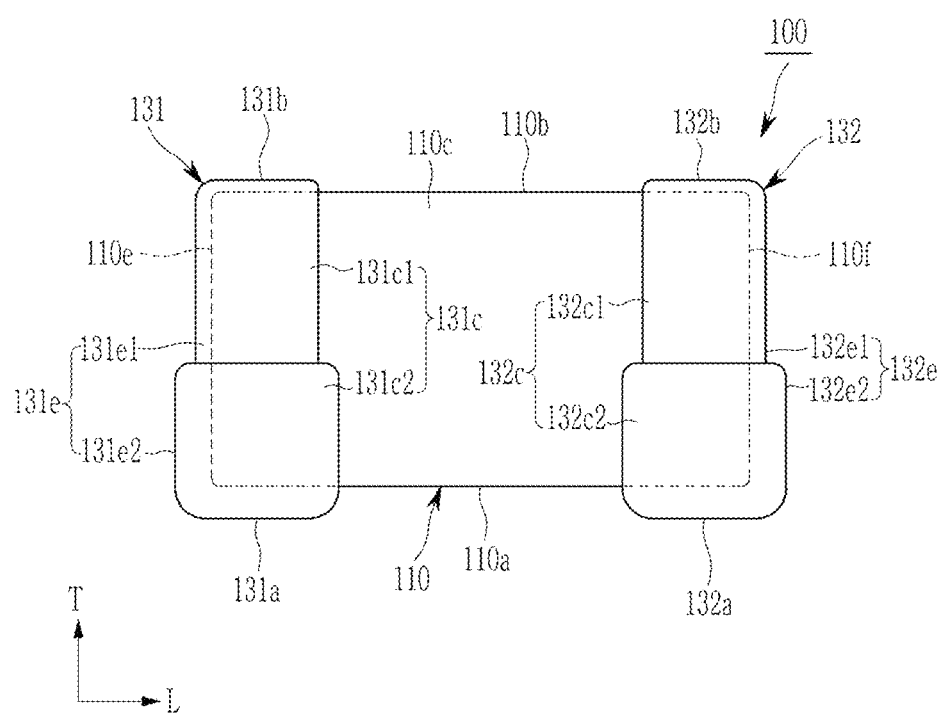
FIG. 3 is a side view of a multilayered capacitor according to one aspect.
Figure 4:
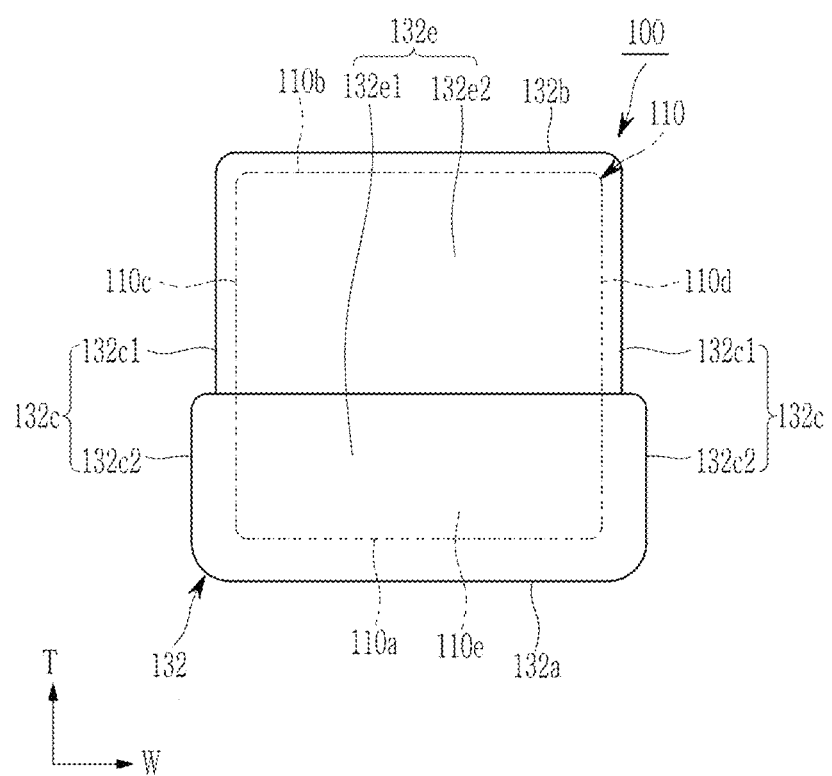
FIG. 4 is another side view of a multilayered capacitor according to one aspect.
Figure 5:
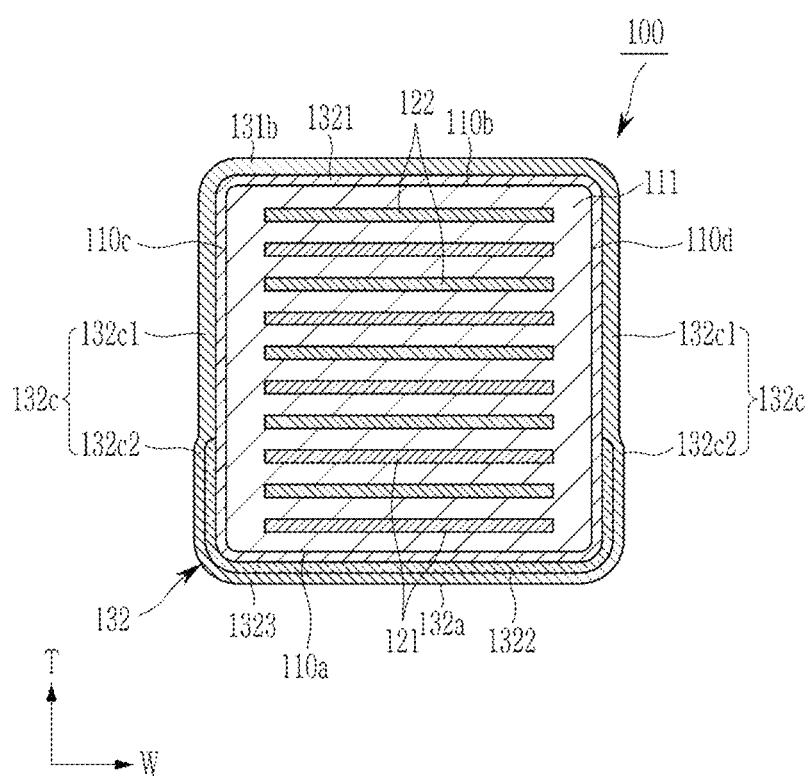
FIG. 5 is a cross-sectional view of a multilayered capacitor according to one aspect.
Figure 6:
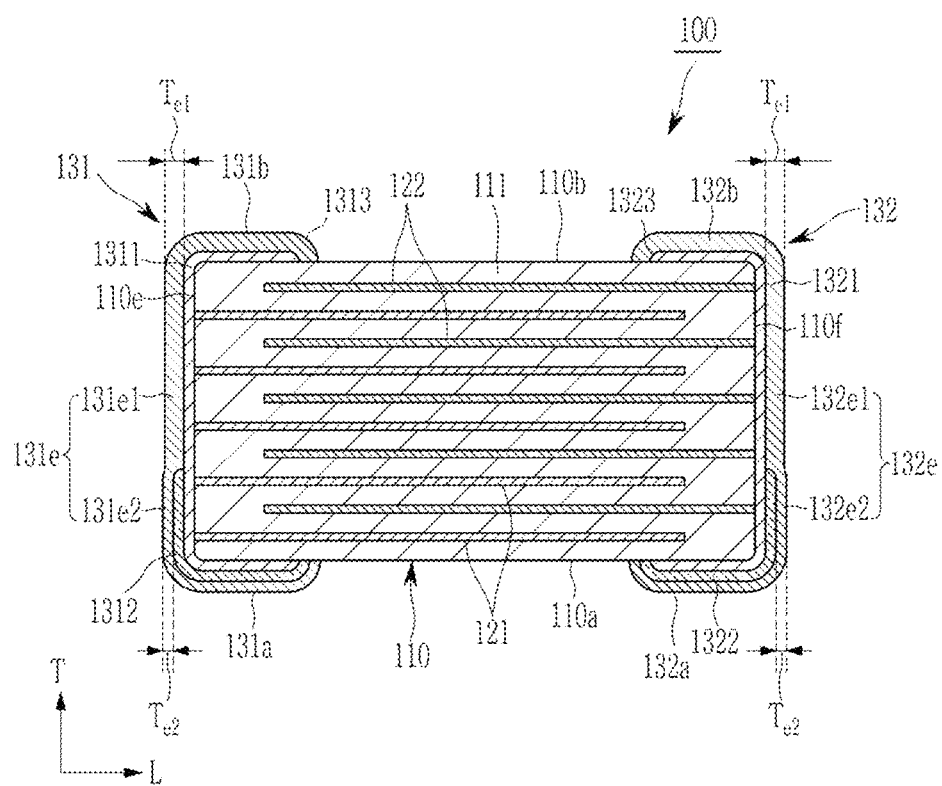
FIG. 6 is another cross-sectional view of a multilayered capacitor according to one aspect.

FIG. 1 is a plan view of a multilayered capacitor according to one aspect, FIG. 2 is another plan view of a multilayered capacitor according to one aspect, FIG. 3 is a side view of a multilayered capacitor according to one aspect, FIG. 4 is another side view of a multilayered capacitor according to one aspect, FIG. 5 is a cross-sectional view of a multilayered capacitor according to one aspect, and FIG. 6 is another cross-sectional view of a multilayered capacitor according to one aspect.

When directions are defined to clearly describe one aspect according to present disclosure, the L-axis, W-axis, and T-axis indicated in the drawings represent the longitudinal direction, the width direction, and the thickness direction of the capacitor body 110, respectively. Herein, the thickness direction (T-axis direction) may be a direction perpendicular to the wide surface (main surface) of the sheet-shaped components, and may be, for example, used in the same concept as the stacking direction in which the dielectric layers 111 are stacked. The longitudinal direction (L-axis direction) may be a direction substantially perpendicular to the thickness direction (T-axis direction) in a direction extending parallel to the wide surface (main surface) of the sheet-shaped components, and may be, for example, a direction in which the first and second external electrodes 131 and 132 are disposed. The width direction (W-axis direction) may be a direction that extends parallel to the wide surface (main surface) of the sheet-shaped components and is substantially perpendicular to the thickness direction (T-axis direction), and the length of the sheet-like components in the longitudinal direction (L-axis direction) may be longer than the length in the width direction (W-axis direction).

Referring to FIGS. 1 to 6, a multilayered capacitor 100 according to according to one aspect may include the capacitor body 110, and first and second external electrodes 131 and 132 disposed at both ends of the capacitor body 110 which oppose each other in the longitudinal direction (L-axis direction).

The capacitor body 110 may have, for example, a substantially hexahedral shape.

In the present disclosure, for convenience of explanation, in the capacitor body 110, surfaces opposite to each other in the thickness direction (T-axis direction) are defined as first and second surfaces 110a and 110b, surfaces connected to the first and second surfaces 110a and 110b and opposing each other in the longitudinal direction (L-axis direction) are defined as third and fourth surfaces 110e and 110f, and surfaces connected to the first and second surfaces 110a and 110b, connected to the third and fourth surfaces 110e and 110f, and opposing each other in the width direction (W-axis direction) are defined as fifth and sixth surfaces 110c and 110d.

For example, the first surface 110a, which is a lower surface, may be a surface facing a mounting direction. In addition, the first to sixth surfaces 110a, 110b, 110e, 110f, 110c, and 110d may be flat, but the present disclosure is not limited thereto, for example, the first to sixth surfaces 110a, 110b, 110e, 110f, 110c, and 110d may be curved surfaces with a convex central portion, and an edge of each surface which is a boundary, may be round.

The shape and dimensions of the capacitor body 110 and the number of stacked dielectric layers 111 are not limited to those shown in the drawings of the present embodiment.

The capacitor body 110 is formed by stacking a plurality of the dielectric layers 111 in the thickness direction (T-axis direction) and then firing them, and includes a plurality of dielectric layers 111, and a plurality of first and second internal electrodes 121 and 122 which are alternately disposed in a thickness direction (T-axis direction) with the dielectric layers 111 interposed therebetween. For example, the first and second internal electrodes 121 and 122 may have different polarities.

Herein, the boundary between the respective dielectric layers 111 adjacent to each other of the capacitor body 110 may be integrated to the extent that it is difficult to check without using a scanning electron microscope (SEM). Also, the capacitor body 110 may include an active region and a cover region.

The active region contributes to generating a capacitance of the multilayered capacitor 100. For example, the active region may be a region in which the first and second internal electrodes 121 and 122 are stacked and overlapped with each other along the thickness direction (T-axis direction).

The cover region may be respectively disposed on the first surface 110a and the second surface 110b of the active region in the thickness direction (T-axis direction) as margin portions. The cover region may be formed by stacking a single dielectric layer 111 or two or more dielectric layers 111 on an upper surface and a lower surface of the active region, respectively.

In addition, the capacitor body 110 may further include a side cover region. The side cover region is a margin portion, and may be respectively disposed on the fifth and sixth surfaces 110c and 110d of the active region in the width direction (W-axis direction). Such a side cover region may be formed by coating a conductive paste layer for forming an internal electrode only on a portion of the surface of the dielectric green sheet, stacking dielectric green sheets on which a conductive paste layer is not coated on both side surfaces of the dielectric green sheet, and firing the same.

The cover region and the side cover regions serve to prevent damage to the first and second internal electrodes 121 and 122 due to physical or chemical stress.

For example, the dielectric layer 111 may include a ceramic material having a high dielectric constant. For example, the ceramic material may include a dielectric ceramic containing components such as $BaTiO_3$, $CaTiO_3$, $SrTiO_3$, or $CaZrO_3$. In addition, auxiliary components such as a Mn compound, a Fe compound, a Cr compound, a Co compound, and a Ni compound may be further included in addition to these components. For example, $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$ in which Ca, Zr, etc. are partially dissolved in $BaTiO_3$-based dielectric ceramics.

In addition, a ceramic powder, a ceramic additive, an organic solvent, a plasticizer, a binder, a dispersant, and the like may be further added to the dielectric layer 111. The ceramic additive may include, for example, transition metal oxide or transition metal carbide, a rare earth element, magnesium (Mg), or aluminum (Al), and the like.

For example, an average thickness of the dielectric layer 111 may be about 0.5 μm to about 10 μm.

The first and second internal electrodes 121 and 122 are electrodes having different polarities, and are alternately disposed to face each other along the thickness direction (T-axis direction) with the dielectric layer 111 interposed therebetween, and one end thereof may be exposed through the third and fourth surfaces 110e and 110f of the capacitor body 110.

The first and second internal electrodes 121 and 122 may be electrically insulated from each other by the dielectric layer 111 disposed therebetween.

Ends of the first and second internal electrodes 121 and 122 alternately exposed through the third and fourth surfaces 110e and 110f of the capacitor body 110 are connected to the first and second external electrodes 131 and 132, respectively, to be electrically connected.

The first and second internal electrodes 121 and 122 may include a conductive metal, such as Ni, Cu, Ag, Pd, or Au, or an alloy thereof, for example an Ag—Pd alloy.

Also, the first and second internal electrodes 121 and 122 may include dielectric particles having the same composition as the ceramic material included in the dielectric layer 111.

The first and second internal electrodes 121 and 122 may be formed using a conductive paste containing a conductive metal. As a method of printing the conductive paste, a screen-printing method or a gravure printing method or the like may be used.

For example, each average thickness of the first and second internal electrodes 121 and 122 may be about 0.1 μm to about 2 μm. In one example, the term "about" may refer to a concept including a minute difference caused by a process error. For example, "about a value" may include not only a case of being "the value", but also a case of having a minute difference caused by a process error or a measurement, recognizable by one of ordinary skill in the art. The first and second external electrodes 131 and 132 are supplied with voltages of different polarities, and are electrically connected to exposed portions of the first and second internal electrodes 121 and 122, respectively.

According to the above configuration, when a predetermined voltage is applied to the first and second external electrodes 131 and 132, charges are accumulated between the first and second internal electrodes 121 and 122. At this time, a capacitance of the multilayered capacitor 100 is proportional to an overlapping area of the first and second internal electrodes 121 and 122 overlapping each other along the T-axis direction in the active region.

The first external electrode 131 may have first to fourth electrode portions 131a, 131b, 131c, and 131e. The second external electrode 132 may have first to fourth electrode portions 132a, 132b, 132c, and 132e. The first electrode portions 131a and 132a are disposed on the first surface 110a. The second electrode portions 131b and 132b are disposed on the second surface 110b. The third electrode portions 131c and 132c are disposed on the fifth and sixth surfaces 110c and 110d, respectively. The fourth electrode portions 131e and 132e are disposed on the third and fourth surfaces 110e and 110f, respectively. In other words, the first and second external electrodes 131 and 132 are disposed respectively on the first and second surfaces 110a and 110b, the fifth and sixth surfaces 110c and 110d, and the third surface 110e or the fourth surface 110f and thus on the five surfaces in total. The first to fourth electrode portions 131a, 132a, 131b, 132b, 131c, 132c, 131e, and 132e adjacent to each other are connected at the corners of the capacitor body 110 and thus electrically connected.

The fourth electrode portions 131e and 132e cover ends exposed to the third and fourth surfaces 110e and 110f of the first and second internal electrodes 121 and 122. The first and second internal electrodes 121 and 122 are directly connected to the fourth electrode portions 131e and 132e and respectively electrically connected to the first and second external electrodes 131 and 132.

The first and second external electrodes 131 and 132 respectively have sintered metal layers 1311 and 1321, conductive resin layers 1312 and 1322, and plating layers 1313 and 1323. The plating layers 1313 and 1323 constitute outermost layers of the first and second external electrodes 131 and 132.

The first electrode portions 131a and 132a include sintered metal layers 1311 and 1321, conductive resin layers 1312 and 1322, and plating layers 1313 and 1323. That is, the first electrode portions 131*a* and 132*a* have a three-layer structure. In the first electrode portions 131*a* and 132*a*, the entire sintered metal layers 1311 and 1321 may be covered with the conductive resin layers 1312 and 1322.

The second electrode portions 131*b* and 132*b* have sintered metal layers 1311 and 1321 and plating layers 1313 and 1323, but do not have conductive resin layers 1312 and 1322. That is, the second electrode portions 131*b* and 132*b* have a two-layer structure.

The third electrode portions 131*c* and 132*c* have the first regions 131*c*1 and 132*c*1 and the second regions 131*c*2 and 132*c*2. The second regions 131*c*2 and 132*c*2 are disposed closer to the first surface 110*a* than the first regions 131*c*1 and 132*c*1. The first regions 131*c*1 and 132*c*1 have the sintered metal layers 1311 and 1321 and the plating layers 1313 and 1323 but no conductive resin layers 1312 and 1322. In other words, the first regions 131*c*1 and 132*c*1 have a two-layer structure. The second regions 131*c*2 and 132*c*2 have the sintered metal layers 1311 and 1321, the conductive resin layers 1312 and 1322, and the plating layers 1313 and 1323. In other words, the second regions 131*c*2 and 132*c*2 have a three-layer structure.

The fourth electrode portions 131*e* and 132*e* have the first regions 131*e*1 and 132*e*1 and the second regions 131*e*2 and 132*e*2. The second regions 131*e*2 and 132*e*2 are disposed closer to the first surface 110*a* than the first regions 131*e*1 and 132*e*1. The first regions 131*e*1 and 132*e*1 have the sintered metal layers 1311 and 1321 and the plating layers 1313 and 1323 but no conductive resin layers 1312 and 1322. In other words, the first regions 131*e*1 and 132*e*1 have a two-layer structure. The second regions 131*e*2 and 132*e*2 have the sintered metal layers 1311 and 1321, the conductive resin layers 1312 and 1322, and the plating layers 1313 and 1323. In other words, the second regions 131*e*2 and 132*e*2 have a three-layer structure.

In the third electrode portions 131*c* and 132*c*, a stacking direction (T-axis direction) average length of the second regions 131*c*2 and 132*c*2 is equal to or smaller than that of the third electrode portions 131*c* and 132*c*. For example, in the third electrode portions 131*c* and 132*c*, the stacking direction (T-axis direction) average length of the second regions 131*c*2 and 132*c*2 may be less than or equal to about 95% of that of the third electrode portions 131*c* and 132*c*. In the third electrode portions 131*c* and 132*c*, when the stacking direction (T-axis direction) average length of the second regions 131*c*2 and 132*c*2 is greater than about 95% of that of the third electrode portions 131*c* and 132*c*, lifting may be generated, deteriorating ESR. Or, in the third electrode portions 131*c* and 132*c*, the stacking direction (T-axis direction) average length of the second regions 131*c*2 and 132*c*2 may be about 10% to about 30% to cover a height that a solder rises, when the multilayered capacitor 100 is mounted in a board.

The sintered metal layers 1311 and 1321 directly contact the capacitor body 110 and are disposed respectively on the third and fourth surfaces 110*e* and 110*f* of the capacitor body 110 and thus connected with the first and second internal electrodes 121 and 122. The sintered metal layers 1311 and 1321 are disposed on the first electrode portions 131*a* and 132*a*, the second electrode portions 131*b* and 132*b*, the first regions 131*c*1 and 132*c*1 and the second regions 131*c*2 and 132*c*2 of the third electrode portions 131*c* and 132*c*, and the first regions 131*e*1 and 132*e*1 and second regions 131*e*2 and 132*e*2 of the fourth electrode portions 131*e* and 132*e*. In other words, the sintered metal layers 1311 and 1321 may be disposed on the first surface 110*a*, the second surface 110*b*, the third surface 110*e*, the fourth surface 110*f*, the fifth surface 110*c*, and the sixth surface 110*d*.

The conductive resin layers 1312 and 1322 are disposed to cover portions of the sintered metal layers 1311 and 1321 but expose other portions thereof. The conductive resin layers 1312 and 1322 are disposed on the first electrode portions 131*a* and 132*a*, the second regions 131*c*2 and 132*c*2 of the third electrode portions 131*c* and 132*c*, and the second regions 131*e*2 and 132*e*2 of the fourth electrode portions 131*e* and 132*e*. The conductive resin layers 1312 and 1322 are not formed in the second electrode portions 131*b* and 132*b*, the first regions 131*c*1 and 132*c*1 of the third electrode portions 131*c* and 132*c*, and the first regions 131*e*1 and 132*e*1 of the fourth electrode portions 131*e* and 132*e*. That is, the conductive resin layers 1312 and 1322 may not be disposed on the second surface 110*b*, and may be disposed on the first surface 110*a*, the third surface 110*e* or the fourth surface 110*f*, the fifth surface 110*c*, and the sixth surface 110*d*.

The plating layers 1313 and 1323 are disposed so as to cover the entire regions of the exposed sintered metal layers 1311 and 1321 that are not covered by the conductive resin layers 1312 and 1322. The plating layers 1313 and 1323 are disposed in the first regions 131*c*1 and 132*c*1 and the second regions 131*c*2 and 132*c*2 of the first electrode portions 131*a* and 132*a*, the second electrode portions 131*b* and 132*b*, the third electrode portions 131*c* and 132*c* and also, the first regions 131*e*1 and 132*e*1 and the second regions 131*e*2 and 132*e*2 of the fourth electrode portions 131*e* and 132*e*. In other words, the plating layers 1313 and 1323 may be disposed on the first surface 110*a*, the second surface 110*b*, the third surface 110*e*, the fourth surface 110*f*, the fifth surface 110*c*, and the sixth surface 110*d*.

The sintered metal layers 1311 and 1321, which the first to fourth electrode portions 131*a*, 132*a*, 131*b*, 132*b*, 131*c*, 132*c*, 131*e*, and 132*e* respectively have, may be integrally connected. The conductive resin layers 1312 and 1322, which the first, third, and fourth electrode portions 131*a*, 132*a*, 131*c*, 132*c*, 131*e*, and 132*e* respectively have, may be integrally connected. The plating layers 1313 and 1323, which the first to fourth electrode portions 131*a*, 132*a*, 131*b*, 132*b*, 131*c*, 132*c*, 131*e*, and 132*e* respectively have, may be integrally connected.

The sintered metal layers 1311 and 1321 may include a conductive metal and glass.

For example, the sintered metal layers 1311 and 1321 may include copper (Cu), nickel (Ni), silver (Ag), palladium (Pd), gold (Au), platinum (Pt), tin (Sn), tungsten (W), titanium (Ti), lead (Pb), an alloy thereof, or a combination thereof, as a conductive metal, and for example the copper (Cu) may include a copper (Cu) alloy. When the conductive metal includes copper, a metal other than copper may be included in an amount of less than or equal to about 5 parts by mole based on 100 parts by mole of copper.

For example, the sintered metal layers 1311 and 1321 may include a composition of oxides as a glass, for example, one or more selected from a silicon oxide, a boron oxide, an aluminum oxide, a transition metal oxide, an alkali metal oxide, and an alkaline earth metal oxide. Herein, the transition metal may be selected from zinc (Zn), titanium (Ti), copper (Cu), vanadium (V), manganese (Mn), iron (Fe), and nickel (Ni); the alkali metal may be selected from lithium (Li), sodium (Na), and potassium (K); and the alkaline-earth metal may be selected from magnesium (Mg), calcium (Ca), strontium (Sr), and barium (Ba).

Each content of the conductive metal and the glass in the sintered metal layer is not particularly limited, but for example, on the cross-section (L-axis direction and T-axis direction cross-section) of the multilayered capacitor 100 cut in the longitudinal direction (L-axis direction) and thickness direction (T-axis direction) perpendicular to the width direction (W-axis direction) at the middle (½) of the width direction (W-axis direction), an average area of the conductive metal may be about 30% to about 90% or about 70% to about 90% of a total area of the sintered metal layers 1311 and 1321.

The conductive resin layers 1312 and 1322 are formed on the sintered metal layers 1311 and 1321, and may be formed to completely cover the sintered metal layers 1311 and 1321.

The conductive resin layers 1312 and 1322 extend to the first, second, fifth, and sixth surfaces 110a, 110b, 110c, and 110d of the capacitor body 110, regions (i.e., band portions) where the conductive resin layers 1312 and 1322 extend to the first, second, fifth, and sixth surfaces 110a, 110b, 110c, and 110d of the capacitor body 110 may be longer than regions (i.e., band portions) where the sintered metal layers 1311 and 1321 extend to the first, second, fifth, and sixth surfaces 110a, 110b, 110c, and 110d of the capacitor body 110. In other words, the conductive resin layers 1312 and 1322 are formed on the sintered metal layers 1311 and 1321 to completely cover the sintered metal layers 1311 and 1321.

The conductive resin layers 1312 and 1322 include a resin and a conductive metal.

The resin included in the conductive resin layers 1312 and 1322 is not particularly limited as long as it has bondability and impact absorption properties and can be mixed with the conductive metal powder to form a paste, and may include, for example, a phenolic resin, an acrylic resin, a silicone resin, an epoxy resin, or a polyimide resin.

The conductive metal included in the conductive resin layers 1312 and 1322 serves to be electrically connected to the sintered metal layers 1311 and 1321 or the plating layers 1313 and 1323.

The conductive metal included in the conductive resin layers 1312 and 1322 may have a spherical shape, a flake shape, or a combination thereof. That is, the conductive metal may be formed only in a flake shape, only in a spherical shape, or may have a mixed shape of a flake shape and a spherical shape.

Herein, the spherical shape may also include a shape that is not perfectly spherical, and may include a shape in which, for example, a length ratio between a major axis and a minor axis (long axis/short axis) is less than or equal to about 1.45. The flake-shaped powder means a powder having a flat and elongated shape, and is not particularly limited, but, for example, a length ratio between a major axis and a minor axis (long axis/short axis) may be greater than or equal to about 1.95.

The conductive resin layers 1312 and 1322 may include copper (Cu), silver (Ag), nickel (Ni), or a mixture thereof as a conductive metal.

The first and second external electrodes 131 and 132 may further include plating layers 1313 and 1323 outside the conductive resin layers 1312 and 1322.

The plating layers 1313 and 1323 may include nickel (Ni), copper (Cu), tin (Sn), palladium (Pd), platinum (Pt), gold (Au), silver (Ag), tungsten (W), titanium (Ti), or lead (Pb), alone or an alloy thereof. For example, the plating layers 1313 and 1323 may be a nickel (Ni) plating layer or a tin (Sn) plating layer, and may have a form in which a nickel (Ni) plating layer and a tin (Sn) plating layer are sequentially stacked or a tin (Sn) plating layer, a nickel (Ni) plating layer, and a tin (Sn) plating layer are sequentially stacked. In addition, the plating layers 1313 and 1323 may include a plurality of nickel (Ni) plating layers and/or a plurality of tin (Sn) plating layers.

The plating layers 1313 and 1323 may improve mountability with a board, structural reliability, heat resistance, and equivalent series resistance (ESR) of the multilayered capacitor 100.

The plating layers 1313 and 1323 extend to the first and second surfaces 110a and 110b or the fifth and sixth surfaces 110c and 110d. Regions (i.e., band portion) where plating layers 1313 and 1323 extend to the first and second surfaces 110a and 110b or the fifth and sixth surfaces 110c and 110d of the capacitor body 110 may be longer than regions (i.e., a band portion) where the conductive resin layers 1312 and 1322 extend to the first and second surfaces 110a and 110b or the fifth and sixth surfaces 110c and 110d of the capacitor body 110. In other words, the plating layers 1313 and 1323 are formed on the conductive resin layers 1312 and 1322 to completely cover the conductive resin layers 1312 and 1322.

On the other hand, the conductive resin layers 1312 and 1322 have larger electrical resistance than the sintered metal layers 1311 and 1321. The thicker the conductive resin layers 1312 and 1322, that is, the more volume, the larger electrical resistance of the conductive resin layers 1312 and 1322. Accordingly, a large volume of the conductive resin layers 1312 and 1322 adversely affects electric characteristics of the multilayered capacitor 100 such as equivalent series resistance (ESR) and equivalent series Inductance (ESL), etc.

In addition, the conductive resin layers 1312 and 1322 include a polymer resin, and in the polymer resin, —OH (hydroxide group) improves bonding strength between the conductive resin layers 1312 and 1322 and the sintered metal layers 1311 and 1321, but some of the resin may be oxidized by the conductive metal, generating $CO_2$ gas. The $CO_2$ gas generated through a series of reactions may be herded in voids inside the conductive resin layers 1312 and 1322 and on the interface of the conductive resin layers 1312 and 1322 with the sintered metal layers 1311 and 1321 and cause interface lifting and bursting in the multilayered capacitor 100, while the multilayered capacitor 100 is mounted in a board, that is, heat is applied thereto. In addition, as the plating layers 1313 and 1323 are thicker, the stress applied to the multilayered capacitor 100 increases, resultantly cracking the multilayered capacitor 100.

One aspect of the present disclosure is to adjust a thickness of the plating layers 1313 and 1323, while minimizing a volume of the conductive resin layers 1312 and 1322, to suppress the cracks, increase the equivalent series resistance (ESR), and suppress the bursting defects.

Hereinafter, in the first regions 131e1 and 132e1, an average thickness of the plating layers 1313 and 1323 is $T_{e1}$, and in second region 131e2 and 132e2, an average thickness of the plating layers 1313 and 1323 is $T_{e2}$.

In the first regions 131e1 and 132e1, the average thickness ($T_{e1}$) of the plating layers 1313 and 1323 may be an average thickness of the plating layers 1313 and 1323 in the first regions 131e1 and 132e1 of the third electrode portions 131c and 132c or the fourth electrode portion 131e and 132e, and in the second regions 131e2 and 132e2, the average thickness ($T_{e2}$) of the plating layers 1313 and 1323 may be an average thickness of the plating layers 1313 and 1323 in the first regions 131e1 and 132e1 of the third electrode portions 131c and 132c or the fourth electrode portion 131e and 132e.

In the third electrode portions 131c and 132c, the thickness of the plating layers 1313 and 1323 of the first regions 131c1 and 132c1 and the second regions 131c2 and 132c2 means a length of the longitudinal direction (L-axis direction) in the third and fourth surfaces 110e and 110f. In the fourth electrode portions 131e and 132e, a thickness of the plating layers 1313 and 1323 of the first regions 131e1 and 132e1 and the second regions 131e2 and 132e2 means a length of the width direction (W-axis direction) in the fifth surface and the sixth surface 110c and 110d.

Hereinafter, the average thickness of the plating layers 1313 and 1323 of the first regions 131e1 and 132e1 and the second regions 131e2 and 132e2 in the fourth electrode portions 131e and 132e is mainly described, which will be equally applicable to an average thickness of the plating layers 1313 and 1323 of the first regions 131c1 and 132c1 and the second regions 131c2 and 132c2 in the third electrode portions 131c and 132c.

The average thickness of the plating layers 1313 and 1323 may be analyzed by examining a cross-section (L-axis direction and T-axis direction cross-section) of the multilayered capacitor 100 cut at the center (½ point) of the width direction (W-axis direction) in the longitudinal direction and the stacking direction perpendicular to the width direction (W-axis direction) or a cross-section (hereinafter, referred to as "cross-section") at the center (½ point) of the longitudinal direction (L-axis direction) in the width direction (W-axis direction) and the stacking direction (T-axis direction) perpendicular to the longitudinal direction (L-axis direction) with a scanning electron microscope (SEM) or a scanning transmission electron microscope (STEM), etc. In addition, the measurement is performed at at least 3, 5, or 10 different points or on the cross-section, which are used to calculate an arithmetic mean.

A cross-section sample of the multilayered capacitor 100 may be, for example, prepared by mounting the multilayered capacitor 100 in an epoxy mold, polishing the multilayered capacitor 100, until the cross-section is exposed, and coating it for 10 seconds with a Pt coater.

The scanning electron microscope (SEM) may be, for example, Verios G4 manufactured by ThermoFisher Scientific Inc., which is used at 100 magnification times, so that the first and second external electrodes 131 and 132 may be exposed outward from the interface between the first and second external electrodes 131 and 132 and the dielectric layer 111.

The average thickness of the plating layers 1313 and 1323 in the first regions 131e1 and 132e1 or the second regions 131e2 and 132e2 may be, in the scanning electron microscope (SEM) image of the cross-section sample of the multilayered capacitor 100, an arithmetic mean of thicknesses of the plating layers 1313 and 1323 at 10 points spaced with a predetermined interval from a reference point, which is any point of the first regions 131e1 and 132e1 or the second regions 131e2 and 132e2.

The reference point may be, for example, a ¼ point, a ½ point, or a ¾ point of the entire length of the first regions 131e1 and 132e1 in the thickness direction (T-axis direction), and the interval of the 10 points may be adjusted according to a scale of the scanning electron microscope (SEM) image, for example, about 1 μm to about 100 μm, about 1 μm to about 50 μm, or about 1 μm to about 10 μm.

Herein, the 10 points all must be located within the first regions 131e1 and 132e1 or the second regions 131e2 and 132e2, but when the 10 points are not located within the first regions 131e1 and 132e1, the reference point may be relocated, or the interval of the ten points may be adjusted.

In the first regions 131e1 and 132e1, the average thickness $(T_{e1})$ of the plating layers 1313 and 1323 is larger than the average thickness $(T_{e2})$ of the plating layers 1313 and 1323 in the second regions 131e2 and 132e2.

For example, $T_{e2} \leq 0.8 \times T_{e1}$, $T_{e2} \leq 0.7 \times T_{e1}$, $T_{e2} \leq 0.6 \times T_{e1}$, $T_{e2} \leq 0.5 \times T_{e1}$, $T_{e2} \leq 0.4 \times T_{e1}$, $T_{e2} \leq 0.3 \times T_{e1}$, or $0.2 \times T_{e1} < T_{e2} \leq 0.8 \times T_{e1}$. In the second regions 131e2 and 132e2, the average thickness $(T_{e2})$ of the plating layers 1313 and 1323 is about 20 to about 80 based on 100 of the average thickness $(T_{e1})$ of the plating layers 1313 and 1323 in the first regions 131e1 and 132e1. In addition, in the first regions 131e1 and 132e1, a minimum thickness of the plating layers 1313 and 1323 may be larger than a maximum thickness of the plating layers 1313 and 1323 in the second regions 131e2 and 132e2.

In other words, in the second regions 131e2 and 132e2 including the conductive resin layers 1312 and 1322, the average thickness $(T_{e2})$ of the plating layers 1313 and 1323 is thinner, but in the first regions 131e1 and 132e1 including no conductive resin layers 1312 and 1322, the average thickness $(T_{e1})$ of the plating layers 1313 and 1323 is thicker. In addition, when the multilayered capacitor 100 is mounted on a board, the average thickness $(T_{e2})$ of the plating layers 1313 and 1323 in the second regions 131e2 and 132e2 in contact with a solder is much thinner. As the average thickness $(T_{e2})$ of the plating layers 1313 and 1323 in the second regions 131e2 and 132e2 is much thinner, bending strength characteristics may be improved by relieving stress in the multilayered capacitor 100, when an external force is applied thereto and thus, suppressing crack generation.

In the first regions 131e1 and 132e1, the average thickness $(T_{e1})$ of the plating layers 1313 and 1323 may be about 6 μm to about 12 μm or about 8 μm to about 15 μm.

In the second regions 131e2 and 132e2, the average thickness $(T_{e2})$ of the plating layers 1313 and 1323 may be about 2 μm to about 8 μm or about 3 μm to about 10 μm. In the second regions 131e2 and 132e2, when the average thickness $(T_{e2})$ of the plating layers 1313 and 1323 is less than about 2 μm, the plating may be broken, but when greater than about 10 μm, the bending strength may be deteriorated.

A method of manufacturing a multilayered capacitor according to another aspect includes manufacturing a capacitor body including a dielectric layer and an internal electrode, and forming an external electrode outside the capacitor body.

First, the manufacturing of the capacitor body is described. In the manufacturing process of the capacitor body, a dielectric paste to become the dielectric layer after firing and a conductive paste to become the internal electrode after firing are prepared.

The dielectric paste is prepared, for example, by the following method. Ceramic materials are uniformly mixed by means such as wet mixing, dried, and heat-treated under predetermined conditions to obtain calcined powder. To the obtained calcined powder, an organic vehicle or an aqueous vehicle is added and kneaded to prepare a dielectric paste.

A dielectric green sheet is obtained by forming the obtained dielectric paste into a sheet by a doctor blade method or the like. In addition, the dielectric paste may include an additive selected from various dispersants, plasticizers, dielectrics, subcomponent compounds, or glass as needed.

Conductive paste for the internal electrode is prepared by kneading conductive powder made of a conductive metal or an alloy thereof with a binder or a solvent. The conductive paste for the internal electrode may include ceramic powder (for example, barium titanate powder) as a co-material, if necessary. The co-material may act to suppress sintering of the conductive powder during the firing process.

On the surface of the dielectric green sheet, the conductive paste for an internal electrode is coated in a predetermined pattern by various printing methods such as screen printing or a transfer method. After stacking a plurality of layers of dielectric green sheets on which internal electrode patterns are formed, a dielectric green sheet stack is obtained by pressing in the stacking direction. At this time, the dielectric green sheets and internal electrode patterns may be stacked so that the dielectric green sheets may be disposed on the upper and lower surfaces of the dielectric green sheet stack in the stacking direction.

Optionally, the obtained dielectric green sheet stack may be cut into predetermined dimensions by dicing or the like.

In addition, the dielectric green sheet stack may be solidified and dried to remove the plasticizer, etc. and barrel-polished by using a centrifugal barrel machine or the like after the solidification-drying. In the barrel polishing, the dielectric green sheet stack is put with a medium and a polishing liquid into a barrel container, and then the barrel container is applied with rotational motion or vibration to polish unnecessary parts such as burrs and the like generated during the cutting. In addition, after the barrel polishing, the dielectric green sheet stack is washed with a cleaning solution such as water and the like and dried.

The dielectric green sheet stack is treated to remove the binder and fired, obtaining the capacitor body.

The binder removal may be performed under conditions appropriately adjusted according to a main component composition of the dielectric layer or a main component composition of the internal electrode. For example, the binder removal may be performed by increasing a temperature at about 5° C./hr to about 300° C./hr and maintaining about 180° C. to about 400° C. for about 0.5 hours to about 24 hours. The binder removal may be performed under an air atmosphere or a reducing atmosphere.

The firing treatment may be performed under conditions appropriately adjusted according to the main component composition of the dielectric layer or the main component composition of the internal electrode. For example, the firing may be performed at about 1200° C. to about 1350° C. or about 1220° C. to about 1300° C. for about 0.5 hours to about 8 hours or about 1 hour to about 3 hours. The firing may be performed under a reducing atmosphere, for example, an atmosphere in which a mixed gas of nitrogen gas ($N_2$) and hydrogen gas ($H_2$) is humidified. When the internal electrode includes nickel (Ni) or a nickel (Ni) alloy, an oxygen partial pressure may be about $1.0 \times 10^{-14}$ MPa to about $1.0 \times 10^{-10}$ MPa under the firing atmosphere.

After the firing treatment, annealing may be performed, if needed. The annealing is performed for re-oxidizing the dielectric layer, and when the firing is performed under a reducing atmosphere, the annealing may be performed. The annealing may be performed under conditions appropriately adjusted according to the main component composition and the like of the dielectric layer. For example, the annealing may be performed at about 950° C. to about 1150° C. for about 0 hour to about 20 hours by increasing the temperature at about 50° C./hour to about 500° C./hour. The annealing may be performed under a humid nitrogen gas ($N_2$) atmosphere, wherein an oxygen partial pressure may be about $1.0 \times 10^{-9}$ MPa to about $1.0 \times 10^{-5}$ MPa.

In the binder removal treatment, the firing treatment, or the annealing treatment, in order to humidify nitrogen gas, mixed gas, or the like, a wetter or the like may be for example, used, wherein a water temperature may be about 5° C. to about 75° C. The binder removal treatment, the firing treatment, and the annealing treatment may be performed continuously or independently.

Optionally, the third and fourth surfaces of the obtained capacitor body may be surface-treated through sandblasting, laser irradiation, barrel polishing, or the like. This surface treatment may expose the ends of the first and second internal electrodes on the outer surfaces of the third and fourth surfaces, thereby improving the electrical connection of the first and second external electrodes and first and second internal electrodes and easily forming the alloy portion.

Optionally, on the outer surface of the obtained capacitor body, a paste for forming the sintered metal layer is coated and sintered to form the sintered metal layer.

The paste for forming the sintered metal layer may include a conductive metal and glass. The conductive metal and the glass are the same as described above and will not be repeated illustrated again. In addition, the paste for forming the sintered metal layer may optionally include a subcomponent such as a binder, a solvent, a dispersant, a plasticizer, or oxide powder. For example, the binder may include ethyl cellulose, acryl, butyral, or the like, and the solvent may use an organic solvent such as terpineol, butyl carbitol, alcohol, methylethylketone, acetone, or toluene, or an aqueous solvent.

A method of coating the paste for forming the sintered metal layer on the outer surface of the capacitor body may include various printing methods such as a dip method, or screen printing, a coating method by using a dispenser, a spray method by using a spray, and the like. The paste for the sintered metal layer may be coated on at least the third and fourth surfaces of the capacitor body, and optionally, on a portion of the first surface, the second surface, the fifth surface, or the sixth surface where the band portions of the first and second external electrodes are formed.

Subsequently, the capacitor body on which the paste for forming the sintered metal layer is coated is dried and then sintered at a temperature of about 700° C. to about 1000° C. for about 0.1 hour to about 3 hours to form a sintered metal layer.

On the outer surface of the obtained capacitor body, a paste for forming a conductive resin layer is coated and cured to form a conductive resin layer.

The paste for forming the conductive resin layer may include a resin and optionally, a conductive metal or a non-conductive filler. The conductive metal and the resin are the same as described above and will not be repeated illustrated again. In addition, the paste for forming the conductive resin layer may optionally include a subcomponent such as a binder, a solvent, a dispersant, a plasticizer, or an oxide powder. For example, the binder may include ethyl cellulose, acryl, butyral, or the like, and the solvent may include an organic solvent such as terpineol, butyl carbitol, alcohol, methylethylketone, acetone, or toluene, or an aqueous solvent.

For example, a method of forming the conductive resin layer may include dipping the capacitor body 110 into the paste for forming the conductive resin layer to form the conductive resin layer and curing it, screen-printing or gravure-printing the paste for forming the conductive resin layer on the surface of the capacitor body 110, or coating the paste for forming the conductive resin layer on the surface of the capacitor body 110 and then curing it.

However, the paste for forming the conductive resin layer may be coated so as to cover a portion of the sintered metal layer and leave other portions exposed. For example, the paste for forming the conductive resin layer may be coated such that the conductive resin layer is not located on the second surface, but on the first surface, a portion of the third surface, a portion of the fifth surface, and a portion of the sixth surface.

Next, a plating layer is formed on the outside of the conductive resin layer. For example, the plating layer may be formed by a plating method, or may be formed by sputtering or electroplating (electric deposition).

Herein, a method of adopting a partial plating device using a laser or partially dipping an object to be plated in a plating solution may be used to form the plating layers in the first and second regions to have a different average thickness. In addition, even a general barrel plating method may be used to change a speed of forming plating seeds according to a material and thus form the plating layer in the first region to have a different average thickness from that of the plating layer in the second region.

Hereinafter, specific examples of the invention are presented. However, the examples described below are only for specifically illustrating or explaining the invention, and the scope of the invention is not limited thereto.

Preparation Examples: Manufacturing of Multilayered Capacitor

A paste including barium titanite (BaTiO$_3$) powder is coated on a carrier film and then dried, manufacturing a plurality of dielectric green sheets.

A conductive paste including nickel (Ni) is screen-printed on each dielectric green sheet to form a conductive paste layer.

A dielectric green sheet stack is manufactured by stacking the plurality of dielectric green sheets, while at least each portion of the conductive paste layers thereon is overlapped.

The dielectric green sheet stack is cut into individual chips, which are maintained under an air atmosphere at 230° C. for 60 hours to remove a binder and then fired at 1200° C., manufacturing a capacitor body.

Next, a paste for the sintered metal layer containing glass and copper (Cu) as a conductive metal is coated on the outer surface of the capacitor body by dip method, dried, and sintered to form the sintered metal layer.

Subsequently, a paste for a conductive resin layer containing an epoxy resin and copper (Cu) as a conductive metal is coated on the outer surface of the capacitor body by a dip method, dried, and cured to form a conductive resin layer. However, the paste for a conductive resin layer may not be coated on the second surface but on the first surface, a portion of the third surface, a portion of the fifth surface, and a portion of the sixth surface.

After forming the conductive resin layer, nickel (Ni) and tin (Sn) plating proceeds, manufacturing multilayered capacitors according to examples and comparative examples. Herein, when the barrel plating method is used, since the speed of forming the plating seeds may vary according to a material, an average thickness of the plating layer in the second region is different even under the same current density and time conditions from that of the plating layer in the first region, as shown in Table 1.

Experimental Example: Performance Measurement of Multilayered Capacitor

The multilayered capacitor according to the preparation example is measured with respect to an average thickness of the plating layers in the first and second regions.

The multilayered capacitor is mounted in an epoxy mold, polished to about ½ of a depth of the W-axis direction along the L-axis direction and T-axis direction surfaces (e.g., fifth surface), and coated for 10 seconds with a Pt coater, preparing a cross-section sample.

In the prepared cross-section sample, where the first or second connection portion and the first or second band portion are visible are respectively measured with SEM (Scanning Electron Microscope) at 100 magnification times in a BSE mode.

In the scanning electron microscope (SEM) image, a method of measuring an average thickness of the plating layers is the same as above, which will not be repeatedly illustrated.

Figure 7:
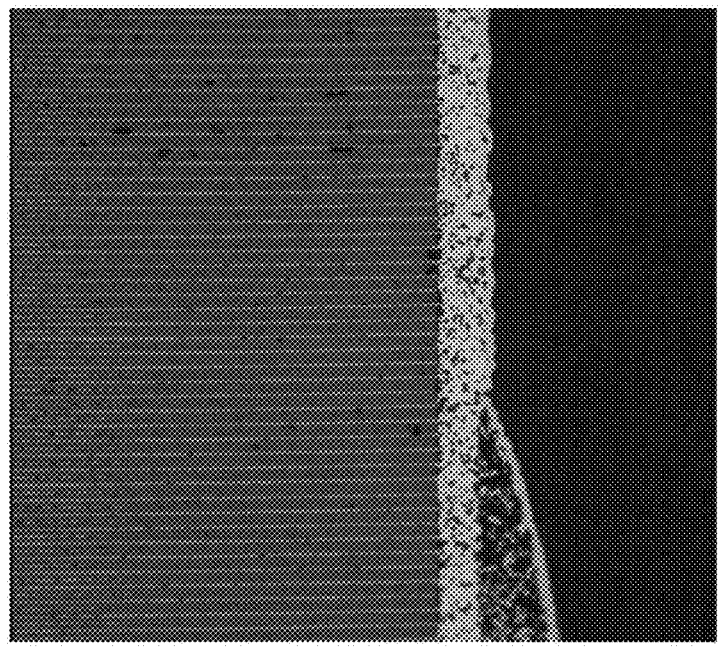
FIG. 7 is a scanning electron microscope photograph of a third electrode portion measured in a multilayered capacitor manufactured in Example 2.
Figure 8:
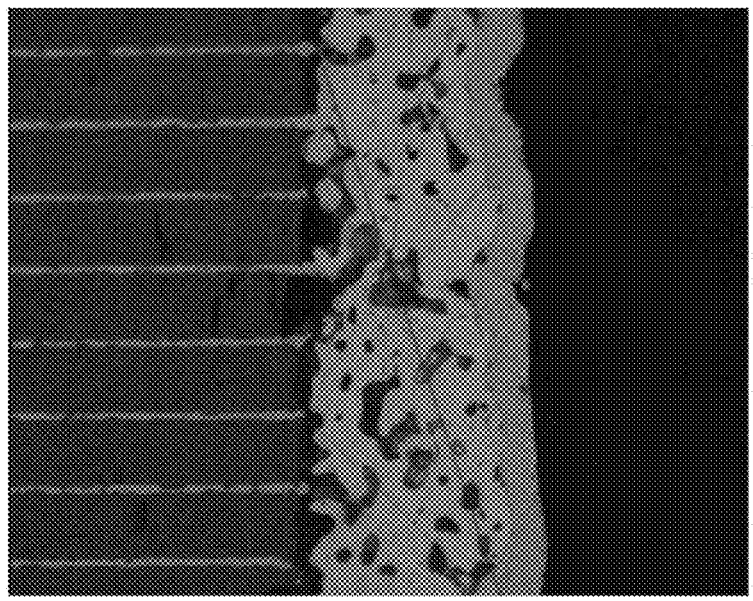
FIG. 8 is an enlarged scanning electron microscope image of the first region in FIG. 7.
Figure 9:
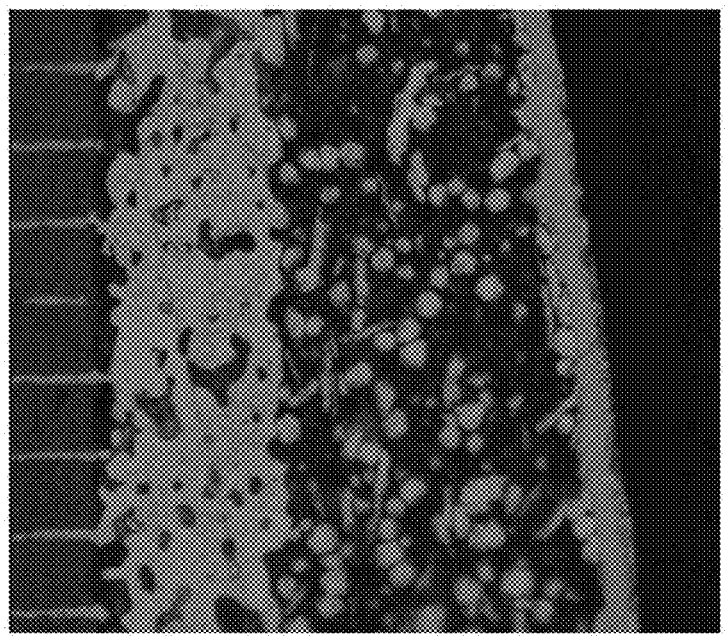
FIG. 9 is an enlarged scanning electron microscope image of the second region in FIG. 7.

FIG. 7 is a scanning electron microscope photograph of a third electrode portion measured in a multilayered capacitor manufactured in Example 2, FIG. 8 is an enlarged scanning electron microscope image of the first region in FIG. 7. The average thickness of the plating layer in the first region can be measured using FIG. 8 and the average thickness of the plating layer in the first region measured in FIG. 8 is 6.5 μm. FIG. 9 is an enlarged scanning electron microscope image of the second region in FIG. 7. The average thickness of the plating layer in the second region can be measured using FIG. 9, and the average thickness of the plating layer in the second region measured in FIG. 9 is 4.4 μm. According to one example shown in FIG. 7, an average thickness of the sintered metal layer in the first region may be greater than an average thickness of the sintered metal layer in the second region.

Experimental Example 2

The multilayered capacitors according to the examples and the comparative examples are measured with respect to bending strength.

20 of each of the multilayered capacitors according to the examples and the comparative examples are prepared. The multilayered capacitors are respectively mounted (soldered) on a bending strength board (PCB) and then fixed onto a board by reflows.

The bending strength is, for example, measured by using TT28025S, Keithely 6485*4, Keithely 6487*1 made by Tira.

The bending strength is evaluated by conducting a three-point bending experiment, wherein the board mounted with the multilayered capacitor is placed between two supports at an interval of 90 mm, so that the multilayered capacitor may be positioned in the middle, and connected to a measuring instrument to measure initial charge charging and a leakage current during the evaluation. When the connection is completed, the bending strength-measuring equipment is used to push the board to bend the multilayered capacitor and simultaneously, check whether or not charges charged in the multilayered capacitor are leaked in a current-measuring method, when 5 mm pressed down. Subsequently, the cross-section of the multilayered capacitor is examined to determine its defect mode.

TABLE 1

| | Average thickness ratio of plating layer | | Bending strength (n = 30) | |
|---|---|---|---|---|
| | first region | second region | Number of cracks | Number of occurrences of peeling off |
| Comparative Example 1 | 1.0 | 1.0 | 2/30 | 4/30 |

TABLE 1-continued

| | Average thickness ratio of plating layer | | Bending strength (n = 30) | |
|---|---|---|---|---|
| | first region | second region | Number of cracks | Number of occurrences of peeling off |
| Comparative Example 2 | 1.0 | 0.9 | 1/30 | 2/30 |
| Example 1 | 1.0 | 0.8 | 0/30 | 1/30 |
| Example 2 | 1.0 | 0.6 | 0/30 | 0/30 |
| Example 3 | 1.0 | 0.4 | 0/30 | 0/30 |
| Comparative Example 3 | 1.0 | 0.2 | Plating interruption occurs | Plating interruption occurs |

Referring to Table 1, as shown in Examples 1 to 3, when the average thickness of the plating layer in the second region is less than or equal to 80% of that of the plating layer in the first region, bending cracks are significantly much less generated than Comparative Examples 1 and 2, in which the average thickness of the plating layer in the second region is greater than 80% of that of the plating layer in the first region.

While this disclosure has been described in connection with what is presently considered to be practical example embodiments, it is to be understood that the disclosure is not limited to the disclosed embodiments. On the contrary, it is intended to cover various modifications and equivalent arrangements included within the spirit and scope of the appended claims.

What is claimed is:

1. A multilayered capacitor, comprising:
a capacitor body including a dielectric layer and an internal electrode; and
an external electrode disposed on the capacitor body,
wherein the external electrode includes a sintered metal layer connected to the internal electrode, a conductive resin layer including a resin and configured to cover a portion of the sintered metal layer and to expose another portion of the sintered metal layer, and a plating layer configured to cover the sintered metal layer and the conductive resin layer,
the external electrode includes a first region including the another portion of the sintered metal layer and a portion of the plating layer, and a second region including the portion of the sintered metal layer, the conductive resin layer, and another portion of the plating layer, and
an average thickness $T_{e1}$ of the plating layer in the first region and an average thickness $T_{e2}$ of the plating layer in the second region satisfy $0.2 \times T_{e1} < T_{e2} \leq 0.8 \times T_{e1}$.

2. The multilayered capacitor of claim 1, wherein a minimum thickness of the plating layer in the first region is greater than a maximum thickness of the plating layer in the second region.

3. The multilayered capacitor of claim 1, wherein $T_{e1}$ is about 6 µm to about 12 µm.

4. The multilayered capacitor of claim 1, wherein $T_{e2}$ is about 2 µm to about 8 µm.

5. The multilayered capacitor of claim 1, wherein the capacitor body has first and second surfaces opposing each other in a stacking direction of the dielectric layer and internal electrode, third and fourth surfaces opposing each other in a longitudinal direction, and fifth and sixth surfaces opposing each other in a width direction.

6. The multilayered capacitor of claim 5, wherein the external electrode includes a first electrode portion on the first surface, a second electrode portion on the second surface, a third electrode portion on the fifth and sixth surfaces, and a fourth electrode portion on one of the third and fourth surfaces.

7. The multilayered capacitor of claim 6, wherein the first electrode portion includes the sintered metal layer, the conductive resin layer, and the plating layer, and
the second electrode portion includes the sintered metal layer and the plating layer and does not include the conductive resin layer.

8. The multilayered capacitor of claim 6, wherein the third electrode portion has the first region and the second region.

9. The multilayered capacitor of claim 8, wherein the second region is closer to the first surface than the first region, and
the first region is closer to the second surface than the second region.

10. The multilayered capacitor of claim 8, wherein in the third electrode portion, an average length of the second region in the stacking direction is less than or equal to about 95% of the total third electrode portion.

11. The multilayered capacitor of claim 6, wherein the fourth electrode portion has the first region and the second region.

12. The multilayered capacitor of claim 11, wherein in the fourth electrode portion, an average length of the second region in the stacking direction is less than or equal to about 95% of the total fourth electrode portion.

13. The multilayered capacitor of claim 11, wherein the second region is closer to the first surface than the first region, and
the first region is closer to the second surface than the second region.

14. The multilayered capacitor of claim 13, wherein the sintered metal layer is disposed in the first electrode portion, the second electrode portion, the first and second regions of the third electrode portion, and the first and second regions of the fourth electrode portion.

15. The multilayered capacitor of claim 13, wherein the conductive resin layer is disposed in the first electrode portion, the second region of the third electrode portion, and the second region of the fourth electrode portion.

16. The multilayered capacitor of claim 13, wherein the plating layer is disposed in the first electrode portion, the second electrode portion, the first region and the second region of the third electrode portion, and the first region and the second region of the fourth electrode portion.

17. The multilayered capacitor of claim 1, wherein the sintered metal layer includes a conductive metal and glass.

18. The multilayered capacitor of claim 1, wherein in the conductive resin layer,
the resin includes an epoxy resin, and
the conductive metal includes copper (Cu), silver (Ag), nickel (Ni), or a mixture thereof.

19. The multilayered capacitor of claim 1, wherein the plating layer includes nickel (Ni), copper (Cu), tin (Sn), palladium (Pd), platinum (Pt), gold (Au), silver (Ag), tungsten (W), titanium (Ti), lead (Pb), an alloy thereof, or a mixture thereof.

* * * * *